United States Patent [19]
Davidovici

[11] Patent Number: 5,894,494
[45] Date of Patent: Apr. 13, 1999

[54] PARALLEL CORRELATOR ARCHITECTURE FOR SYNCHRONIZING DIRECT SEQUENCE SPREAD-SPECTRUM SIGNALS

[75] Inventor: Sorin Davidovici, Jackson Heights, N.Y.

[73] Assignee: Golden Bridge Technology, Inc., N.J.

[21] Appl. No.: 08/958,785

[22] Filed: Oct. 29, 1997

[51] Int. Cl.[6] .......................... H04B 1/707; H04L 27/22
[52] U.S. Cl. .............................. 375/208; 375/200
[58] Field of Search .................. 375/200, 206–208, 375/343, 367; 364/728.03

[56] References Cited

U.S. PATENT DOCUMENTS

| | | | |
|---|---|---|---|
| 4,122,393 | 10/1978 | Gordy et al. | 375/343 |
| 4,149,121 | 4/1979 | Gordy et al. | 375/332 |
| 4,518,947 | 5/1985 | Poston et al. | 341/81 |
| 4,653,069 | 3/1987 | Roeder | 380/31 |
| 4,691,326 | 9/1987 | Tsuchiya | 375/207 |
| 5,016,261 | 5/1991 | Amoroso et al. | 375/317 |
| 5,031,193 | 7/1991 | Atkinson et al. | 375/231 |
| 5,058,128 | 10/1991 | Kurihara et al. | 375/207 |
| 5,276,706 | 1/1994 | Critchlow | 375/343 |
| 5,402,450 | 3/1995 | Lennen | 375/343 |
| 5,426,670 | 6/1995 | Leppanen et al. | 375/343 |
| 5,514,998 | 5/1996 | Kim | 329/300 |
| 5,528,624 | 6/1996 | Kaku et al. | 375/206 |
| 5,541,960 | 7/1996 | Satomura et al. | 375/368 |
| 5,548,613 | 8/1996 | Kaku et al. | 375/208 |
| 5,627,855 | 5/1997 | Davidovici | 375/207 |
| 5,715,276 | 2/1998 | Tran et al. | 375/207 |
| 5,719,852 | 2/1998 | Schilling et al. | 370/201 |
| 5,764,691 | 6/1998 | Hennedy et al. | 375/207 |
| 5,802,102 | 9/1998 | Davidovici | 375/207 |

*Primary Examiner*—Young T. Tse
*Attorney, Agent, or Firm*—David Newman Chartered

[57] ABSTRACT

A spread-spectrum-correlator apparatus including a symbol-shift register, an in-phase-symbol correlator, a quadrature-phase-symbol correlator, a frame-shift register, an in-phase-frame correlator, a quadrature-phase-frame correlator, and a control processor. The symbol-shift register circulates replicas of a header-chip-sequence signal or data-chip-sequence signal, which are used for in-phase-symbol correlating and the quadrature-phase-symbol correlating. The in-phase-frame correlator and the quadrature-phase-frame correlator detect a despread-header-symbol-sequence signal and generate a maximum output signal which may be used as a data-start signal or for synchronizing the timing of the control processor as to when to trigger sampling of the analog-to-digital converter, to set which chip-sequence signal is circulated in the symbol-shift register, to control the output of the symbol correlator, to detect the data-symbol-sequence signal and other time-dependent processes.

24 Claims, 3 Drawing Sheets

PARALLEL CORRELATOR ARCHITECTURE FOR SYNCHRONIZING DIRECT SEQUENCE SPREAD-SPECTRUM SIGNALS

BACKGROUND OF THE INVENTION

This invention relates to spread spectrum communications, and more particularly to a matched filter having a parallel correlator architecture which can be used for synchronizing to, and despreading of, a direct sequence, spread-spectrum signal.

DESCRIPTION OF THE RELEVANT ART

Spread-spectrum communications require that an incoming spreading chip-code sequence embedded in a spread-spectrum signal, and the local spreading chip-code sequence at a receiver, be phase synchronized prior to processing of information transfer. Phase synchronization of the spreading chip code sequences is commonly known as code acquisition. Code acquisition is one of the most difficult issues facing the system designer.

Code acquisition is followed by the tracking process. Due to imperfect frequency references the incoming spreading chip-code sequence and the local spreading chip-code sequence tend to lose phase synchronization. Retaining the phase synchronization, or tracking, is a difficult process that typically employs feedback loops.

SUMMARY OF THE INVENTION

A general object of the invention is a spread-spectrum receiver which reduces cost and circuit complexity, reduces the volume required and improves the performance, i.e., acquisition time, of conventional spread-spectrum chip-sequence signal acquisition.

Another object of the invention is a spread-spectrum receiver which has improved bit-error-rate (BER) performance over conventional coherent demodulation techniques, methods and circuits.

An additional object of the invention is to reduce cost and circuit complexity, reduce the volume required and improve the performance of conventional diversity reception, separation and combining techniques, methods and circuits.

According to the present invention, as embodied and broadly described herein, a spread-spectrum-correlator apparatus is provided including a symbol correlator, a symbol-shift register, a frame correlator, a frame-shift register and a control processor, i.e., a controller. The frame correlator is coupled to the output of the symbol correlator. The symbol-shift register is coupled to the symbol correlator and to the control processor. The frame-shift register is coupled to the frame correlator, and the frame correlator is coupled between the symbol correlator and the control processor.

The spread-spectrum-correlator apparatus can be used as part of a spread-spectrum receiver, for receiving a received-spread-spectrum signal. A received-spread-spectrum signal, as used herein, is a spread-spectrum signal arriving at the input of the spread-spectrum receiver. The received-spread-spectrum signal is assumed to include a plurality of packets. Each packet has a header followed in time by data. The header and data are sent as a packet, and the timing for the data in the packet is triggered from the header. The data may contain information such as digitized voice, signalling, adaptive power control (APC), cyclic-redundancy-check (CRC) code, etc.

The header, or preamble, is generated from spread-spectrum processing a header-symbol-sequence signal with a chip-sequence signal. The data part of the packet is generated from spread-spectrum processing a data-symbol-sequence signal with the chip-sequence signal. The chip-sequence signal for spread-spectrum processing the header-symbol-sequence signal and the data-symbol-sequence signal may be, but do not have to be, the same. Preferably the header-chip-sequence signal is different from the data-chip-sequence signal.

The symbol-shift register at the spread-spectrum receiver circulates a replica of the header-chip-sequence signal or a replica of the data-chip-sequence signal. By circulate is meant that the replica of the header-chip-sequence signal is shifted between the plurality of stages of the symbol-shift register. The symbol correlator has a symbol-impulse response which is matched to the header-chip-sequence signal and data-chip-sequence signal of the received-spread-spectrum signal, depending on which of the replica of the header-chip-sequence signal or replica of the data-chip-sequence signal is being circulated in the symbol-shift register. If the header-chip-sequence signal were the same as the data-chip-sequence signal, then the symbol-impulse response is identical for the header and data, due to the common chip-sequence signal being circulated in the symbol-shift register. The replica of the header-chip-sequence signal circulated by the symbol-shift register is used to set or match the symbol-impulse response of the symbol correlator.

With the header-chip-sequence signal circulating in the symbol-shift register, the symbol correlator correlates, at an output of each stage of the symbol-shift register, a header-signal sample of the received-spread-spectrum signal, and outputs, for each header-signal sample, a plurality of header correlation signals which correspond to the plurality of stages of the symbol-shift register, respectively. From a multiplicity of header-signal samples, and the plurality of header-correlation signals for each of the header-signal samples, the symbol correlator detects a plurality of despread-header-symbol signals from the received-spread-spectrum signal, as a despread-header-symbol-sequence signal. Thus, upon receiving the received-spread-spectrum signal having the header-chip-sequence signal embedded therein, the symbol correlator can output the header-symbol-sequence signal.

The replica of the header-symbol-sequence signal circulated by the frame-shift register matches the impulse response of the frame correlator to the header-symbol-sequence signal of the header embedded in the received-spread-spectrum signal. Thus, the frame correlator has an impulse response, denoted herein as the frame-impulse response, which is matched to the header-symbol-sequence signal. The start-data signal is triggered upon detecting the header-symbol-sequence signal in the frame correlator. Accordingly, the frame correlator correlates the despread header and generates, as an output, a start-data signal in response to the header matching the frame correlator's impulse response.

The control processor controls to which of the symbol-impulse responses the symbol correlator is set, by setting the symbol-shift register to circulate either a replica of the header-chip-sequence signal or a replica of the data-chip-sequence signal. The control processor can cause the symbol-impulse response of the symbol correlator to be matched to the particular header-chip-sequence signal and data-chip-sequence signal of the received-spread-spectrum signal. Further, the control processor can generate a plurality of symbol-control signals to cause the symbol-impulse response of the symbol correlator to be matched, sequentially, to a plurality of chip-sequence signals, respectively.

Timing to the control processor can be triggered from the start-data signal generated at the output of the frame correlator. Thus, in response to the start-data signal received from the frame correlator, the control processor can cause the symbol correlator to be matched to the data-chip-sequence signal by setting the replica of the data-chip-sequence signal in the symbol-shift register. At a time delay from the start-data signal, triggered from the start-data signal, the control processor can cause the output of the symbol correlator to be sampled for data symbols.

From the start-data signal, the control processor matches the symbol correlator to the data-chip-sequence signal, by having a replica of the data-chip-sequence signal circulate in the symbol-shift register. The symbol correlator correlates a data-signal sample at the output of each stage of the symbol-shift register. For each data sample, the symbol correlator outputs a plurality of data-correlation signals, corresponding to the plurality of stages of the symbol-shift register. From a multiplicity of data-signal samples and a plurality of data-correlation signals for each of the data-signal samples, the symbol correlator detects a plurality of despread-data-symbol signals as a despread-data-symbol-sequence signal.

The present invention also includes a method for using a symbol correlator and a frame correlator as part of a spread-spectrum receiver on a received-spread-spectrum signal. As with the spread-spectrum-correlator apparatus set forth above, the received-spread-spectrum signal is assumed to include a header followed in time by data. The header and data are sent as a packet, and timing of the packet is triggered, for each packet, off the detected header.

The header is generated from spread-spectrum processing a header-bit-sequence signal with a header-chip-sequence signal. The data are spread-spectrum processed as a data-symbol-sequence signal with the data-chip-sequence signal. The header-chip-sequence signal for spread-spectrum processing the header-bit sequence signal and the data-chip-sequence signal for spread-spectrum processing the data-symbol-sequence signal may be, but do not have to be, the same.

The steps include circulating in the symbol-shift register a replica of the header-chip-sequence signal, and correlating, with the symbol correlator, at the output of each stage of the symbol-shift register, the header-symbol sample of the received-spread-spectrum signal. A plurality of header-correlation signals are outputted from the symbol correlator for each header-signal sample, corresponding to the plurality of stages of the symbol-shift register, respectively. The method includes detecting from the header-correlation signals, a despread-header-symbol signal and from a multiplicity of header-signal samples and the plurality of header-correlation signals for each of the header-signal samples, detecting a plurality of despread-header-symbol signals as a despread-header-symbol-sequence signal.

In the frame-shift register, the method circulates a replica of the header-symbol-sequence signal. At the output of each stage of the frame-shift register, using the frame correlator, the method correlates a symbol-signal sample of the despread-header-symbol-sequence signal, and outputs for each symbol-signal sample, corresponding to the plurality of stages of the frame-shift register, a plurality of frame-correlation signals, respectively. In response to the multiplicity of symbol-signal samples and to outputting the plurality of frame-correlation signals for each of the multiplicity of symbol-signal samples, the method detects a peak-header-correlation signal.

The method further includes the step of generating, in response to the detected peak-header-correlation signal, a start-data signal, and setting the symbol-shift register for circulating a replica of the data-chip-sequence signal in response to the start-data signal. The method correlates, with the symbol-shift register circulating the replica of the data-chip-sequence signal, at the output of the stage of the symbol-shift register, a data-signal sample of the received-spread-spectrum signal. The method outputs, for each data-signal sample, a plurality of data-correlation signals and detects from the plurality of data-correlation signals, a despread data-symbol signal. In response to a multiplicity of data-signal samples and to outputting the plurality of data correlation signals for each of the data-signal samples, the method detects a plurality of despread-data-symbol signals as a despread-data-symbol-sequence signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
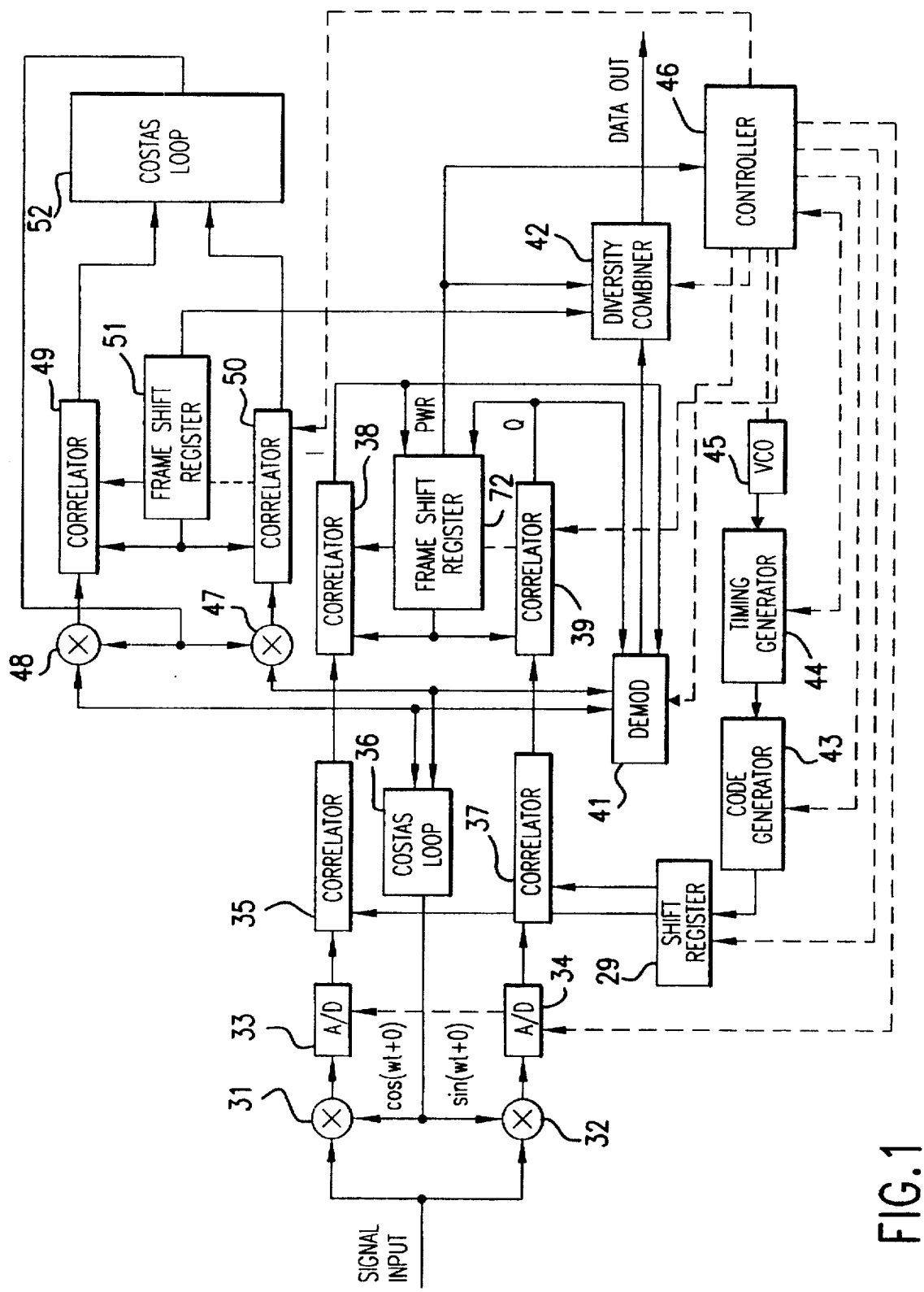
FIG. 1 is a block diagram of a signal-time-sharing, correlator-based demodulator.

Reference now is made in detail to the present preferred embodiments of the invention, examples of which are illustrated in the accompanying drawings, wherein like reference numerals indicate like elements throughout the several views.

The present invention provides a new and novel spread-spectrum-correlator apparatus which can be used as part of a spread-spectrum receiver on a received-spread-spectrum signal.

The received-spread-spectrum signal is assumed to include a plurality of packets. Each packet has a header followed in time by data. The header is generated from spread-spectrum processing, by using techniques well known in the art, a header-symbol-sequence signal with a header-chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The header-chip-sequence signal is user defined, and in a usual practice, is used with a header-symbol-sequence signal.

The data part of the spread-spectrum packet is generated similarly, from techniques well known in the art as used for the header, by spread-spectrum processing a data-symbol-sequence signal with the data-chip-sequence signal. The data-symbol-sequence signal may be derived from data, or an analog signal converted to data, signalling information, or other source of data symbols or bits. The data-symbol-sequence signal typically is a sequence of bits. The data-chip-sequence signal can be user defined, and preferably is nearly orthogonal to other spread-spectrum channels using data-chip-sequence signals, as is well known in the art. The data-chip-sequence signal may be the same as, or different from, the header-chip-sequence signal, within a given packet.

Broadly, the spread-spectrum-correlator apparatus includes a symbol-shift register, symbol-correlator means, a frame-shift register, frame-correlator means, control means, and demodulator means. The symbol-correlator means may be embodied as symbol correlators. The frame-correlator means may be embodied as frame correlators. The control means is electrically coupled to the symbol-shift register, to the frame-shift register and to the frame correlators. The frame correlators are electrically coupled to the frame-shift register and to the output of the symbol correlators. The demodulator means is electrically coupled to the output of the symbol correlators.

The symbol-shift register initially circulates a replica of the header-chip-sequence signal or the data-chip-sequence signal. The replica of the header-chip-sequence signal has the same chip sequence as used for generating, at a spread-spectrum transmitter, the header of the received-spread-spectrum signal which arrives at the input of the spread-spectrum-correlator apparatus. The symbol-shift register can change, over time, the particular chipping sequence from which the replica of the header-chip-sequence signal is generated. Accordingly, the spread-spectrum-correlator apparatus can be used for a variety of header-chip-sequence signals as circulated by the symbol-shift register, as might be used in a cellular spread-spectrum architecture where a receiver might move from one geographical area to another. As the spread-spectrum-correlator apparatus moves from one geographical area to another, by way of example, a requirement might be imposed to change the header-chip-sequence signal in each of the different geographical areas. Similarly, each transmitter within the geographical area of a base station may have a different header-chip-sequence signal.

Each symbol correlator has a symbol-impulse response. The prefix "symbol" is used to denote those means or components which operate on detecting or processing a data symbol or header symbol from the received-spread-spectrum signal. The symbol-impulse response can be set from the replica of the header-chip-sequence signal or data-chip-sequence signal circulated by the symbol-shift register. Thus, the symbol-impulse response may be set for filtering from the received-spread-spectrum signal, the header and the data-symbol-sequence signal. With the symbol-impulse response set to the replica of the header-chip-sequence signal, and with the header portion of the received-spread-spectrum-signal being present at the receiver, the symbol correlators output a despread-header-symbol-sequence signal. Upon detecting the despread-header-symbol sequence, the frame correlators output a high level signal which may be used as a start-data signal. The start-data signal is used to switch from receiving the header to the data portion of the packet. The start-data signal can trigger switching from circulating the header-chip-sequence signal to circulating the data-chip-sequence signal in the symbol-shift register. Alternatively, the start-data signal can trigger when to sample the output of the symbol correlator for data. Other uses of the start-data signal may be to synchronize the sequence of transmit, switch and receive cycles or to generate a timing signal for any other event that is related in time to the header.

The symbol-shift register has a plurality of stages. The symbol-shift register circulates a replica of the header-chip-sequence signal. By circulating is meant shifting through the plurality of stages of the symbol-shift register, the replica of the header-chip-sequence signal. The term circulating is used throughout with an understanding that it means shifting through the symbol-shift register.

When the header-chip-sequence circulates in the symbol-shift register, the symbol correlators correlate at an output of each stage of the symbol-shift register, a header-signal sample of the received-spread-spectrum signal. By header-signal sample meant a signal sample, or a sample, of the received-spread-spectrum signal, which is part of the header. The symbol correlators continue to correlate with the header for so long as the symbol-shift register continues to circulate the replica of the header-chip-sequence signal.

For each header-signal sample, the symbol correlators output a plurality of header-correlation signals, corresponding to the plurality of stages of the symbol-shift register, respectively. From the plurality of header-correlation signals, and for a multiplicity of header-signal samples, the symbol correlators detect a plurality of despread-header-symbol signals as a despread-header-symbol-sequence signal. By despread-header-symbol signal is meant a header-symbol signal embedded in the received-spread-spectrum signal, as part of the header, which has been despread by the replica of the header-chip-sequence signal.

The symbol correlators continue to have the symbol-impulse response set from the replica of the header-chip-sequence signal, since the symbol-shift register continues to circulate the header-chip-sequence signal. The start-data signal triggers the change from circulating the replica of the header-chip-sequence signal to circulating the replica of the data-chip-sequence signal in the symbol-shift register.

When the data portion of the received-spread-spectrum signal is present at the receiver, the symbol correlators correlate the received-spread-spectrum signal. Timing to sample the data portion of the received-spread-spectrum signal is triggered from the start-data signal. Thus, the symbol correlators output the despread-data-symbol-sequence signal. Accordingly, the symbol correlators can despread the header and the data portion of the received-spread-spectrum signal.

Each frame correlator has a frame-impulse response matched to the header-symbol-sequence signal. Thus, the frame correlators correlate the despread-header-symbol-sequence signal from the symbol correlators, and generate as a result thereof, a start-data signal when the despread-header-symbol-sequence signal matches the frame-impulse response. The frame correlators may be programmable, i.e., have a programmable frame-impulse response, which might change between different geographical areas.

The frame-shift register has a plurality of stages. The frame-shift register circulates the replica of the header-symbol-sequence signal.

The frame correlators correlate at an output of each stage of the frame-shift register, a symbol-signal sample of the despread-header-symbol-sequence signal. By symbol-signal sample is meant a sample of the despread-header-symbol-sequence signal as outputted from the symbol correlators. For each symbol-signal sample, the frame correlators output a plurality of frame-correlation signals corresponding to the plurality of stages of the frame-shift register, respectively. For a multiplicity of symbol-signal samples and in response to outputting the plurality of frame-correlation signals for each of the multiplicity of symbol-signal samples, the frame correlators detect a peak-header-correlation signal, and in response to detecting the peak-header-correlation signal, generate a start-data signal. The peak-header-correlation signal may, but need not, serve as the start-data signal.

In response to the start-data signal, the control means sets the symbol-shift register for circulating the replica of the data-chip-sequence signal.

When the symbol-shift register is circulating the replica of the data-chip-sequence signal, the symbol correlators correlate at the output of each stage of the symbol-shift register, a data-signal sample of the received-spread-spectrum signal. By data-signal sample is meant a sample of the received-spread-spectrum signal from the data portion of the packet. For each data-signal sample, corresponding to the plurality of stages of the symbol-shift register, the symbol correlators output a plurality of data-correlation signals, respectively. For the plurality of data-correlation signals and in response to detecting a despread-data-symbol signal, and in response to the multiplicity of data-signal samples and to outputting the data-correlation signals for each of the data-signal samples, the symbol correlators detect a plurality of despread-data-symbol signals as a despread-data-symbol-sequence signal.

The control means controls the setting of the symbol-impulse response of the symbol correlators. The control means can dynamically set the response of the symbol correlators by using the replica of the header-chip-sequence signal generated by the code means, to match the header-chip-sequence signal embedded in the received-spread-spectrum signal. Upon detecting the start-data signal, the control means may change the setting of the symbol-impulse response by having the symbol-shift register circulate a replica of the data-chip-sequence signal. At the end of the data portion of the packet, the control means can reset the symbol-shift register to circulate the header-chip-sequence signal. Clearly, if the header-chip-sequence signal were the same as the data-chip-sequence signal, then there is no requirement for changing the chip-sequence signal circulating in the symbol-shift register, between data and header portions of the packet.

The symbol correlators may include an in-phase-symbol correlator and a quadrature-phase-symbol correlator. The in-phase-symbol correlator correlates, for when the symbol-shift register circulates the replica of the header-chip-sequence signal, at the output of each stage of the symbol-shift register, an in-phase component of the header-signal sample of the received-spread-spectrum signal. For each in-phase component of the header-signal sample, the in-phase-symbol correlator outputs a plurality of in-phase header-correlation signals, corresponding to the plurality of stages of the symbol-shift register, respectively. From the plurality of in-phase header-correlation signals, the in-phase-symbol correlator detects an in-phase despread-header-symbol signal. For a multiplicity of in-phase components of the header-signal samples and in response to outputting the plurality of in-phase header-correlation signals for each of the in-phase components of the header-signal samples, the in-phase-symbol correlator detects a plurality of in-phase despread-header-symbol signals as an in-phase component of the despread-header-symbol-sequence signal.

The quadrature-phase-symbol correlator has a quadrature-phase-impulse response which is set from the replica of the header-chip-sequence signal. When the symbol-shift register circulates the replica of the header-chip-sequence signal, the quadrature-phase-symbol correlator correlates, at the output of each stage of the symbol-shift register, a quadrature-phase component of the header-signal sample of the received-spread-spectrum signal. For each quadrature-phase component of the header-signal sample, corresponding to the plurality of stages of the symbol-shift register, the quadrature-phase-symbol correlator outputs a plurality of quadrature-phase header-correlation signals, respectively. For the plurality of quadrature-phase header-correlation signals and in response to detecting the quadrature-phase despread-header-symbol signal, and in response to a multiplicity of quadrature-phase components of the header-signal samples and to outputting the plurality of quadrature-phase header-correlation signals for each of the quadrature-phase components of the header-signal samples, the quadrature-phase-symbol correlator detects a plurality of quadrature-phase despread-header-symbol signals as a quadrature-phase component of the despread-header-symbol-sequence signal.

In use, the control means initially sets the in-phase-symbol correlator and the quadrature-phase-symbol correlator matched to detect the header-chip-sequence signal. The in-phase-symbol correlator and the quadrature-phase-symbol correlator are matched simultaneously, to the header-chip-sequence signal.

The frame correlators may include an in-phase-frame correlator and a quadrature-phase-frame correlator. The in-phase-frame correlator has an in-phase-frame-impulse response matched to an in-phase component of the header-symbol-sequence signal. The in-phase-frame correlator is coupled to the plurality of stages of the frame-shift register. The in-phase-frame correlator correlates, at the output of each stage of the frame-shift register, an in-phase component of the symbol-signal sample of the despread-header-symbol-sequence signal. The in-phase-frame correlator outputs for each in-phase component of the symbol-signal sample, a plurality of in-phase frame-correlation signals, corresponding to the plurality of stages of the frame-shift register, respectively. In response to a multiplicity of in-phase components of the symbol-signal samples and to outputting the plurality of the in-phase frame-correlation signals for each of the multiplicity of the in-phase component of the symbol-signal samples, the in-phase-frame correlator detects an in-phase peak-header-correlation signal, and generates an in-phase start-data signal in response to detecting the in-phase peak-header-correlation signal.

The quadrature-phase-frame correlator has a quadrature-phase-frame-impulse response matched to a quadrature-phase component of the header-symbol-sequence signal. The quadrature-phase-frame correlator is coupled to the plurality of stages of the frame-shift register. At the output of each stage of the frame-shift register, the quadrature-phase-frame correlator correlates, a quadrature-phase component of the symbol-signal sample of the despread-header-symbol-sequence signal. For each quadrature-phase component of each symbol-signal sample, the quadrature-phase-frame correlator outputs a plurality of quadrature-phase frame-correlation signals, for corresponding to the plurality of stages of the frame-shift register, respectively. In response to a multiplicity of quadrature-phase components of the symbol-signal samples and to outputting the plurality of quadrature-phase frame-correlation signals for each of the multiplicity of the quadrature-phase components of the symbol-signal samples, the quadrature-phase-frame correlator detects the quadrature-phase peak-header-correlation signal, and generates an quadrature-phase start-data signal in response to detecting the quadrature-phase peak-header-correlation signal.

The in-phase-start-data signal and the quadrature-phase-start data signal are combined as the start-data signal. The start-data signal can trigger changing from circulating the replica of the header-chip-sequence signal to circulating the replica of the data-chip-sequence signal in the symbol-shift register. Timing for sampling the output of the in-phase-symbol correlator and the quadrature-phase-symbol correlator for detecting the data-symbol-sequence signal is triggered, at a time delay, from the start-data signal. The time delay may be zero.

In the exemplary arrangement shown in FIG. 1, the symbol-correlator means is embodied as an in-phase-symbol correlator 35 and a quadrature-phase-symbol correlator 37. The symbol-shift register is embodied as symbol-shift register 29. The frame-correlator means is embodied as an in-phase-frame correlator 38 and a quadrature-phase-frame correlator 39. The frame-shift register is embodied as frame-shift register 72. The control means is embodied as a control processor or controller 46, and the demodulator means is embodied as a demodulator 41. The control processor is the controller for the matched-filter with parallel architecture.

The in-phase-symbol correlator 35 and the quadrature-phase-symbol correlator 37 may be constructed as hardware, a digital signal processor, or as software embedded in a processor or as an application specific integrated circuit (ASIC), having a parallel correlation architecture. Also shown is a voltage-controlled oscillator 45, timing generator 44, code generator 43, diversity combiner 42, Costas loop 36 or other generic tracking loop, in-phase analog-to-digital converter 33, quadrature-phase analog-to-digital converter 34, in-phase mixer 31, and quadrature-phase mixer 32.

The symbol-shift register 29 has a plurality of stages. The symbol-shift register 29 circulates the replica of the header-chip-sequence signal.

The symbol correlators are coupled to the plurality of stages of the symbol-shift register 29. The symbol correlators 35, 37 correlate, at an output of each stage of the symbol-shift register 29, the header-signal sample of the received-spread-spectrum signal. The symbol correlators 35, 37 also output, for each header-signal sample, corresponding to the plurality of stages of the symbol-shift register 29, a plurality of header-correlation signals, respectively. In response to the plurality of header-correlation signals, the symbol correlators 35, 37 detect the despread-header-symbol signal. In response to the multiplicity of header-signal samples, and to outputting the plurality of header-correlation signals for each of the header-signal samples, the symbol correlators 35, 37 detect the plurality of despread-header-symbol signals as a despread-header-symbol-sequence signal.

The frame-shift register 72 has a plurality of stages, for circulating a replica of the header-symbol-sequence signal. The frame correlators 38, 39 are coupled to the plurality of stages of the frame-shift register 72. The frame correlators 38, 39 correlate, at an output of each stage of the frame-shift register 72, a symbol-signal sample of the despread-header-symbol-sequence signal. For each symbol-signal sample, corresponding to the plurality of stages of the frame-shift register 72, the frame correlators 38, 39 output a plurality of frame-correlation signals, respectively. In response to the multiplicity of symbol-signal samples and to outputting the plurality of frame-correlation signals for each of the multiplicity of symbol-signal samples, the frame correlators 38, 39 detect a peak-header-correlation signal. In response to detecting the peak-header-correlation signal, the frame correlators 38, 39 generate a start-data signal.

The controller 46 is coupled to the symbol-shift register 29. In response to the start-data signal from the frame correlators 38, 39, the controller 46, using code generator 43, sets the symbol-shift register 29 to circulate a replica of the data-chip-sequence signal. Alternatively, the controller 46 may set when to start sampling the output of the symbol correlators 35, 37.

When the symbol-shift register 29 is circulating the replica of the data-chip-sequence signal, the symbol correlators 35, 37 correlate, at the output of each stage of the symbol-shift register 29, a data-signal sample of the received-spread-spectrum signal. The symbol correlators 35, 37 then output, for each data-signal sample, corresponding to the plurality of stages of symbol-shift register 29, a plurality of data-correlation signals, respectively. From the plurality of data-correlation signals, the symbol correlators 35, 37 detect a despread-data-symbol signal. For the multiplicity of data-signal samples and in response to outputting the plurality of data-correlation signals for each of the data-signal samples, the symbol correlators 35, 37 detect a plurality of despread-data-symbol signals as a despread-data-symbol-sequence signal.

The symbol correlators include an in-phase-symbol correlator 35 and a quadrature-phase-symbol correlator 37. The in-phase-symbol correlator 35 is coupled to the plurality of stages of the symbol-shift register 29. The quadrature-phase-symbol correlator 37 is coupled to the plurality of stages of the symbol-shift register 29.

When the symbol-shift register 29 is circulating the replica of the data-chip-sequence signal, the in-phase-symbol correlator 35 correlates, at the output of each stage of the symbol-shift register 29, an in-phase component of the data-signal sample of the received-spread-spectrum signal. For each in-phase component of the header-signal sample, the in-phase-symbol correlator 35 outputs a plurality of in-phase header-correlation signals, corresponding to the plurality of stages of the symbol-shift register 29, respectively. The in-phase-symbol correlator 35, in response to the plurality of in-phase header-correlation signals, detects an in-phase despread-header-symbol signal. For a multiplicity of in-phase components of the header-signal samples and in response to outputting the plurality of in-phase header-correlation signals for each of the in-phase components of the header-signal samples, the in-phase-symbol correlator 35 detects a plurality of in-phase despread-header-symbol signals as an in-phase component of the despread-header-symbol-sequence signal.

The quadrature-phase-symbol correlator 37 correlates, at the output of each stage of the symbol-shift register 29, a quadrature-phase component of the header-signal sample of the received-spread-spectrum signal. The quadrature-phase-symbol correlator 37 outputs, for each quadrature-phase component of the header-signal sample, a plurality of quadrature-phase header-correlation signals, corresponding to the plurality of stages of the symbol-shift register 29, respectively. For the plurality of quadrature-phase header-correlation signals, the quadratrure-phase-symbol correlator 37 detects a quadrature-phase despread-header-symbol signal. For a multiplicity of quadrature-phase components of the header-signal samples and in response to outputting the quadrature-phase header-correlation signals for each of the quadrature-phase components of the header-signal samples, the quadrature-phase-symbol correlator 37 detects a plurality of quadrature-phase despread-header-symbol signals as a quadrature-phase component of the despread-header-symbol-sequence signal.

The frame correlators include an in-phase-frame correlator 38 and a quadrature-phase-frame correlator 39. The in-phase-frame correlator 38 is coupled to the plurality of stages of the frame-shift register 72, and the quadrature-phase-frame correlator 39 is coupled to the plurality of stages of the frame-shift register 72.

At the output of each stage of the frame-shift register 72, the in-phase-frame correlator 38 correlates an in-phase component of the symbol-signal sample of the despread-header-symbol-sequence signal. For each in-phase component of each symbol-signal sample, the in-phase-frame correlator 38 outputs a plurality of in-phase-frame-correlation signals, corresponding to the plurality of stages of the frame-shift register 72, respectively. For a multiplicity of in-phase components of the symbol-signal samples and in response to outputting the plurality of in-phase-frame-correlation signals for each of the multiplicity of in-phase components of the symbol-signal sample, the in-phase-frame correlator 38 detects an in-phase peak-header-correlation signal. In response to detecting the in-phase peak-header-correlation signal, the in-phase-frame correlator 38, in cooperation with the frame-shift register 72, generates an in-phase start-data signal.

The quadrature-phase-frame correlator 39 correlates, at the output of each stage of the frame-shift register 72, a quadrature-phase component of the symbol-signal sample of the despread-header-symbol-sequence signal. For each quadrature-phase component of each symbol-signal sample, the quadrature-phase-frame correlator 39 outputs a plurality of quadrature-phase-frame-correlation signals, corresponding to the plurality of stages of the frame-shift register 72, respectively. For a multiplicity of quadrature-phase components of the symbol-signal samples and in response to outputting the plurality of quadrature-phase-frame-correlation signals for each of the multiplicity of quadrature-phase components of the symbol-signal sample, the quadrature-phase-frame correlator 39 detects the quadrature-phase peak-header-correlation signal. In response to detecting the quadrature-phase peak-header-correlation signal, the quadrature-phase-frame correlator 39 generates, in cooperation with the frame-shift register 72, a quadrature-phase start-data signal.

The start-data signal is used by the controller 46 to initiate, when sampling the output of the in-phase-symbol correlator 35 and the quadrature-phase-symbol correlator 37, the data portion of the packet. Alternatively, the start-data signal initiates changing circulating in the symbol-shift register 29, from the replica of the header-chip-sequence signal to the replica of the data-chip-sequence signal.

When the symbol-shift register 29 is circulating the replica of the data-chip-sequence signal, the in-phase-symbol correlator 35 correlates, at the output of each stage of the symbol-shift register 29, an in-phase component of the data-signal sample of the received-spread-spectrum signal. For each in-phase component of the data-signal sample, the in-phase-symbol correlator 35 outputs a plurality of in-phase-data-correlation signals, corresponding to the plurality of stages of the symbol-shift register 29, respectively. For the plurality of in-phase-data-correlation signals, the in-phase-symbol correlator 35 detects an in-phase despread-data-symbol signal. For a multiplicity of in-phase components of the data-signal samples and in response to outputting the plurality of in-phase-data-correlation signals, the in-phase-symbol correlator 35 detects a plurality of in-phase despread-data-symbol signals as an in-phase component of the despread-data-symbol-sequence signal.

Similarly, when the symbol-shift register 29 is circulating the replica of the data-chip-sequence signal, the quadrature-phase-symbol correlator 37 correlates, at the output of each stage of the symbol-shift register 29, a quadrature-phase component of the data-signal sample of the received-spread-spectrum signal. For each quadrature-phase component of the data-signal sample, the quadrature-phase-symbol correlator 37 outputs a plurality of quadrature-phase data-correlation signals, corresponding to the plurality of stages of the symbol-shift register 29, respectively. For the plurality of quadrature-phase data-correlation signals, the quadrature-phase-symbol correlator 37 detects a quadrature-phase despread-data-symbol signal. For a multiplicity of quadrature-phase components of the data-signal samples and in response to outputting the plurality of quadrature-phase data-correlation signals for each of the quadrature-phase components of the data-signal samples, the quadrature-phase-symbol correlator 37 detects a plurality of quadrature-phase despread-data-symbol signals as a quadrature-phase component of the despread-data-symbol-sequence signal.

The in-phase-symbol correlator 35 may be embodied as an in-phase digital correlator, and the quadrature-phase-symbol correlator 37 may be embodied as a quadrature-phase digital correlator. Similarly, the in-phase frame correlator 38 may be embodied as an in-phase digital correlator and the quadrature-phase frame correlator 39 may be embodied as a quadrature-phase-digital correlator.

The in-phase analog-to-digital converter 33 is coupled between the in-phase mixer 31 and the in-phase-symbol correlator 35. The quadrature-phase analog-to-digital converter 34 is coupled between the quadrature-phase mixer 32 and the quadrature-phase-symbol correlator 37. The Costas loop 36 is coupled to the output of the in-phase-symbol correlator 35, to the output of the quadrature-phase-symbol correlator 37, and to the in-phase mixer 31 and the quadrature-phase mixer 32. The in-phase-frame correlator 38 is coupled between the in-phase-symbol correlator 35 and the frame shift register 72 and the demodulator 41. The quadrature-phase-frame correlator 39 is coupled between the quadrature-phase-symbol correlator 37 and the frame shift register 72 and the demodulator 41. The code generator 43 is coupled between the timing generator 44 and the symbol-shift register 29. The timing control circuit controls the sampling instant of the timing generator 44 to the in-phase-symbol correlator 35 and the quadrature-phase-symbol correlator 37. The voltage-controlled oscillator 45 is coupled to the timing generator 44 and to the controller 46. The diversity combiner 42 is coupled to the frame shift register 72 and the demodulator 41. The controller 46 is coupled to the frame shift register 72. The prefixes "in-phase" and "quadrature-phase" denote that component, i.e., in-phase or quadrature-phase, of the received-spread-spectrum signal, with which the element operates.

The in-phase analog-to-digital converter 33 and the quadrature-phase analog-to-digital converter 34 may be embodied as a hard limiter which performs one-bit analog-to-digital conversion, or as an N-bit analog-to-digital converter. Analog-to-digital converters are well known in the art.

For control, indicated by broken lines, the controller 46 is coupled to the diversity combiner 42, the in-phase-frame correlator 38, the quadrature-phase-frame correlator 39, the demodulator 41, the timing generator 44, the code generator 43, the in-phase-analog-to-digital converter 33, and the quadrature-phase-analog-to-digital converter 34. The diversity combiner 42 may only process one signal.

For RAKE applications, additional sections of frame correlators would be required. Thus, an additional in-phase mixer 48 and quadrature-phase mixer 47, and in-phase-frame correlator 49 and quadrature-phase-frame correlator 50 would be used with a second frame-shift register 51 and Costas loop 52. The application RAKE is well known in the art, and thus the addition of the additional frame-matched filter section would be easily recognizable to those skilled in the art.

Referring to FIG. 1, a received-spread-spectrum signal at the signal input is translated to an intermediate frequency or baseband frequency by in-phase mixer 31 and quadrature-phase mixer 32. For discussion purposes, the received-spread-spectrum signal is assumed to be translated to a baseband frequency. The portion of the spread-spectrum receiver which includes low noise amplifiers, automatic-gain-control (AGC) circuits, filters, etc., is well known in the art, and therefore, is not shown.

The baseband received-spread-spectrum signal is converted to a digital signal by in-phase analog-to-digital converter 33 and quadrature-phase analog-to-digital converter 34. Thus, a baseband version of the received-spread-spectrum signal is at the input of the in-phase-symbol correlator 35 and the quadrature-phase-symbol correlator 37.

The in-phase-symbol correlator 35, with symbol-shift register 29, has an in-phase-symbol-impulse response which is set by the replica of the header-chip-sequence signal or the replica of the data-chip-sequence signal from code generator 43. Depending on the setting, the in-phase-symbol correlator 35 can despread the received-spread-spectrum signal as a despread-in-phase component of the header-symbol-sequence signal or as a despread-in-phase component of the spread-spectrum-processed data-symbol-sequence signal. Accordingly, the in-phase-symbol correlator 35 outputs either a despread-in-phase component of the header-symbol-sequence signal, or a despread-in-phase component of the spread-spectrum-processed data-symbol-sequence signal as a despread-in-phase-data-symbol-sequence signal.

Similarly, the quadrature-phase-symbol correlator 37, with symbol-shift-register 29, has a symbol-impulse response which can be set by the replica of the header-chip-sequence signal or the replica of the data-chip-sequence signal generated by the code generator 43. Depending on the setting, the quadrature-phase-symbol correlator 37 despreads the received-spread-spectrum signal as a quadrature-phase component of the header-symbol-sequence signal or as a quadrature-phase component of the spread-spectrum-processed data-symbol-sequence signal. Accordingly, the output of the quadrature-phase-symbol correlator 37 is either a despread-quadrature-phase component of the header-symbol-sequence signal or a despread-quadrature-phase component of the spread-spectrum-processed data-symbol-sequence signal as a despread-quadrature-phase-data-symbol-sequence signal.

The in-phase-symbol correlator 35 and the quadrature-phase-symbol correlator 37 are ultimately controlled by the controller 46. The controller 46 controls timing and determines at desired timings when the code generator 43 sets the symbol-impulse responses of the in-phase-symbol correlator 35 and the quadrature-phase-symbol correlator 37 and the symbol-shift register 29 to the respective chip-sequence signal being used in a particular geographic area.

In FIG. 1, the Costas loop 36 uses the output from the in-phase-symbol correlator 35 and the output from the quadrature-phase-symbol correlator 37 to generate the cosine signal and sine signal for in-phase mixer 31 and quadrature-phase mixer 32, respectively.

The spread-spectrum receiver receives packets of header and data, which may arrive as a stream of uninterrupted packets in a frequency division duplex (FDD) application, or as separate packets in a time division duplex (TDD) application. The despread and detected header provides timing and synchronization for data within a respective packet.

When the in-phase-symbol correlator 35 and quadrature-phase-symbol correlator 37 have their respective symbol-impulse responses matched to the chip-sequence signal, and the header portion of the packet of the received-spread-spectrum signal is present at the receiver input, then the output is a despread-header-symbol-sequence signal.

The despread-header-symbol-sequence signal is passed through in-phase-frame correlator 38 and quadrature-phase-frame correlator 39. The in-phase-frame correlator 38, with frame-shift register 72, has an in-phase-frame-impulse response matched to the in-phase component of the header-symbol-sequence signal, and accordingly, generates an in-phase-start-data signal when the in-phase component of the despread-header-symbol-sequence signal matches the in-phase-frame-impulse response. Similarly, the quadrature-phase-frame correlator 39, with frame-shift register 72, has a quadrature-phase-frame-impulse response matched to a quadrature-phase component of the header-symbol-sequence signal. When the despread-header-symbol-sequence signal from the quadrature-phase-symbol correlator 37 matches the quadrature-phase-frame-impulse response of the quadrature-phase correlator 37, then the quadrature-phase-frame correlator 37 outputs a quadrature-phase-start-data signal.

Additionally, the in-phase-start-data signal and the quadrature-phase-start-data signal can be processed by the frame shift register 72 to trigger a timing signal, i.e., the start-data signal, to the controller 46 which actuates the timing for when to sample the outputs of the in-phase-symbol correlator 35 and the quadrature-phase-symbol correlator 37, for detecting the data-symbol-sequence signal.

In a particular implementation of the present invention, the in-phase-symbol correlator 35 and the quadrature-phase-symbol correlator 37 have their respective in-phase-symbol-impulse response and quadrature-phase-symbol-impulse response determined, under the control of the controller 46, such that they are matched to the chip-sequence signal within 6.4 microseconds (64 chips at 10 Mchips/sec). Typically, current designs have these respective symbol-matched filters loaded within 12.8 microseconds, for a system operating at 100 MHz, with each of the in-phase-symbol correlator 35 and the quadrature-phase-symbol correlator 37 using a 256 stage symbol-shift register 29 (256 chips at 20 Mchips/sec).

The demodulator 41 can be implemented using coherent demodulation, or alternatively using noncoherent demodulation.

The diversity combiner 42 combines in a variety of ways, such as maximum likelihood, straight combining, addition, or the demodulated outputs from the in-phase-symbol-correlator filter 35 and the quadrature-phase-symbol correlator 37 as demodulated through demodulator 41.

Figure 2:
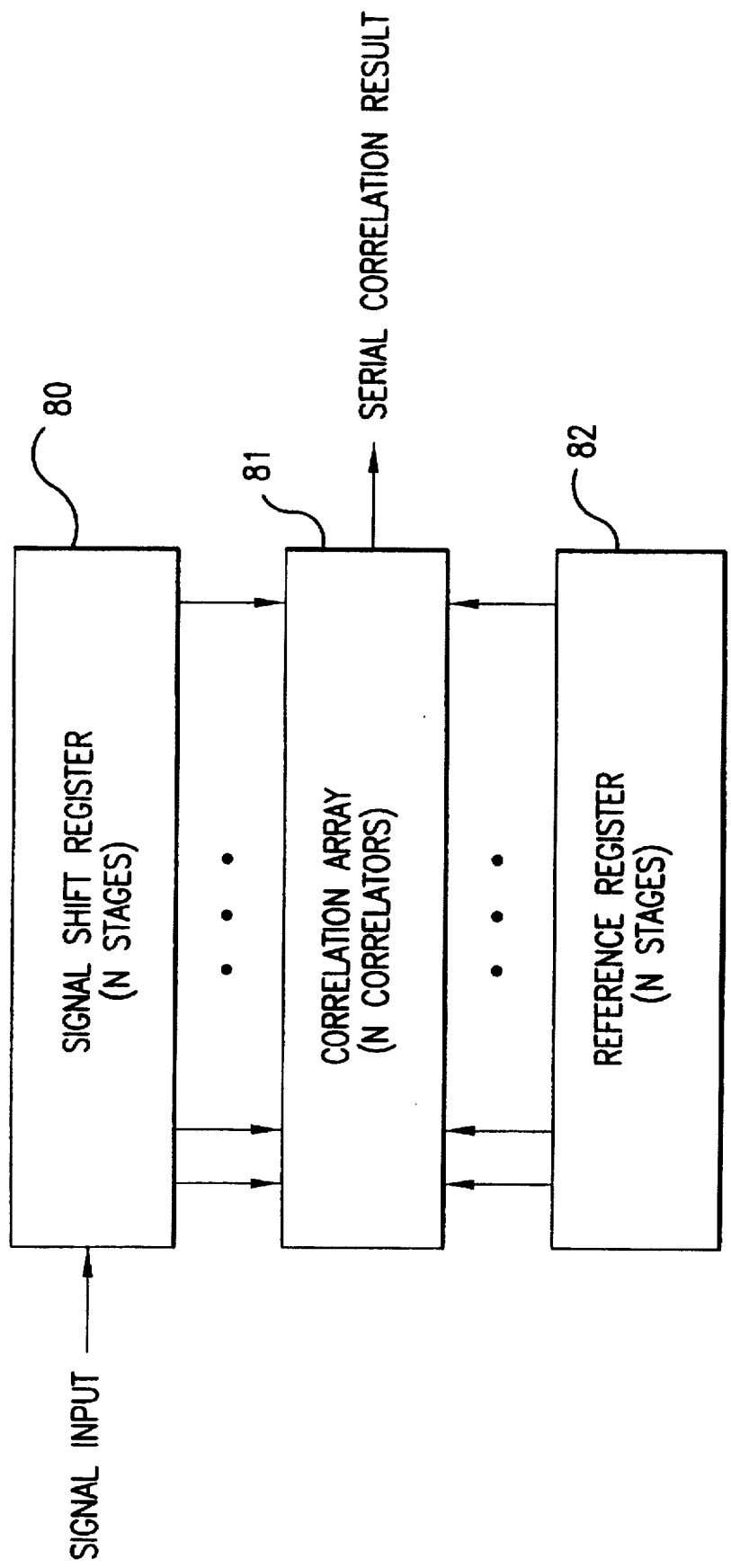
FIG. 2 illustrates a matched-filter tapped delay line architecture.
Figure 3:
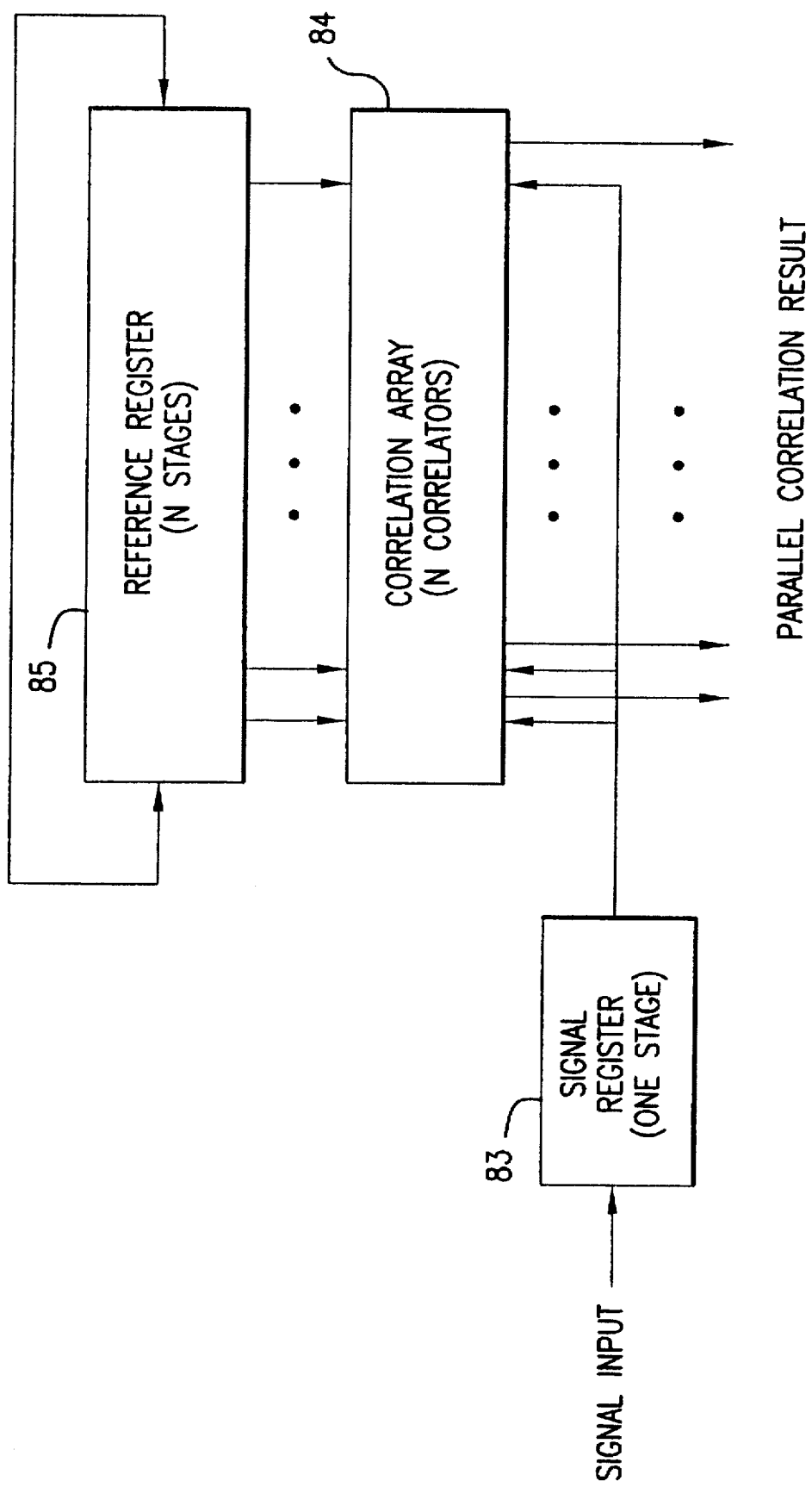
FIG. 3 illustrates a matched-filter parallel correlator architecture.

A matched filter architecture using a tapped delay line (TDL) architecture, as shown in FIG. 2, may be compared with the parallel architecture of the present invention, shown in FIG. 3.

The characteristic feature of the TDL architecture shown in FIG. 2 is that the signal is shifted in through a shift register 80 and then correlated, using a correlation array 81, against a reference stored in a reference register 82. The results of the correlation of the time-shifted version of the signal and the reference appear in a sequential manner at the single output of the matched filter.

FIG. 3 summarizes the parallel architecture of the present invention. Using the parallel architecture, the signal is not shifted through a shift register; no earlier signal samples are kept. Instead the signal enters a signal register 83, and the reference is circulated through a reference register 85. At the output of each stage of the reference register 85, the reference output is correlated, using a correlation array 84, with the single signal sample. The results appear in parallel at the multiple outputs of the correlator apparatus.

The fundamental difference in the input signal samples to each architecture is that, in the architecture shown in FIG. 2, the last N signal samples are kept while the architecture of the present invention, shown in FIG. 3, keeps only the present signal sample. The fundamental difference in the outputs is that, in the architecture shown in FIG. 2, the signal and reference correlation values for different relative shifts are output sequentially while the architecture of the present invention, shown in FIG. 3, outputs the signal and reference correlation values for different relative shifts in parallel.

The present invention also includes a method which uses a symbol correlator and a frame correlator with a spread-spectrum receiver on a received-spread-spectrum signal. As with the apparatus previously disclosed, the received-spread-spectrum signal is assumed to have a plurality of packets, with each packet including a header and data portion. The header is generated from spread-spectrum processing a header-symbol-sequence signal with a chip-sequence signal. The data portion of the packet is generated from spread-spectrum processing a data-symbol-sequence signal with the chip-sequence signal.

The method comprises the steps of generating a replica of the chip-sequence signal. The method programs the symbol correlator with the replica of the chip-sequence signal to set the symbol correlator to have a symbol-impulse response matched to the chip-sequence signal. With the symbol correlator matched to the chip-sequence signal, the method despreads the header portion of the packet from the received-spread-spectrum signal as a despread header-symbol-sequence signal.

The frame correlator has a frame-impulse response matched to the header-symbol-sequence signal. The method therefore uses the frame correlator to correlate the despread header-symbol-sequence signal. The method thereafter generates from the despread-header-symbol-sequence signal, the data-start signal in response to the despread-header-symbol-sequence signal matching the frame-impulse response of the frame correlator.

The method also generates, at a time delay from the data-start signal, a data-control signal. The time delay may be zero. In response to the data-control signal, the method programs the frame correlator with the replica of the data-chip-sequence signal so that the frame correlator has the frame-impulse response matched to the data-symbol-sequence signal. The method thereby despreads, while the frame correlator is matched to the data-symbol-sequence signal, the data-spread-spectrum channel from the received-spread-spectrum signal as a despread-data-symbol-sequence signal.

The method as described herein may be extended to in-phase and quadrature-phase components of a received-spread-spectrum signal. As such, the method would have the step of despreading the header portion of the packet from the received-spread-spectrum signal including the steps of despreading, from the received-spread-spectrum signal, the in-phase component of the header as a despread in-phase component of the header-symbol-sequence signal, and despreading, from the received-spread-spectrum signal, the quadrature-phase component of the header as a despread-quadrature-phase component of the header-symbol-sequence signal.

Similarly, the in-phase component and the quadrature-phase component of the received-spread-spectrum signal can be despread as in-phase components and quadrature-phase components of the data-symbol-sequence signal. Accordingly, the method would include despreading, from the received-spread-spectrum signal, an in-phase component of the data portion of the packet as a despread-in-phase component of the data-symbol-sequence signal. The method would also include despreading a quadrature-phase component of the data portion of the packet as a despread-quadrature-phase component of the data-symbol-sequence signal.

When correlating the despread header-symbol-sequence signal into in-phase components and quadrature-phase components, the method can also include generating an in-phase-start-data signal and a quadrature-phase-start-data signal, in response to the in-phase component and the quadrature-phase component of the despread header-symbol-sequence signal matching the in-phase-frame-impulse response and the quadrature-phase-frame-impulse response, respectively.

In operation, the symbol-shift register 29 is loaded with M local sequence symbols, i.e., the replica of the header-chip-sequence signal. The incoming received-spread-spectrum-signal samples generated by in-phase-analog-to-digital converter 33 and quadrature-phase-analog-to-digital converter 34, respectively, are correlated against the local replica in the symbol-shift register 29. This has the advantage of lower implementation cost, lower physical volume, reduced power consumption, more rapid implementation and much better performance as measured by the time required to achieve code synchronization.

The presence of a strong signal level output indicates that, at that specific moment in time, M incoming signal symbols and the M symbols of the local spreading code, i.e., chip-sequence signal, are in alignment. The requirement exists that the symbol-shift register 29 be fully loaded with the next M symbols of the local spreading code, i.e., the chip-sequence signal, at any time prior to the arrival of the next M incoming signal symbols at the in-phase-symbol correlator 35 and the quadrature-phase-symbol correlator 37. The value of the number M, which denotes the size of the respective symbol correlator as measured in number of signal samples, is much larger than any value on the order of one; in an example embodiment, M is on the order of 250. Because M is much larger than one of the circuits required to implement the code, phase synchronization functions are much easier to design and implement. This has the advantage of lower implementation cost, lower physical volume, reduced power consumption, more rapid implementation and inherently better performance.

The in-phase-symbol correlator 35 and the quadrature-phase-symbol correlator 37 identify, characterize and extract the information which arrives through all available channels, or paths, intrinsically, without any additional and parallel signal processing paths. The spreading code loaded as a local reference in symbol-shift register 29 for the in-phase-symbol correlator 35 and the quadrature-phase-symbol correlator 37 remain in place until all propagation channels have the opportunity to deliver the information signal at the in-phase-symbol correlator 35 and the quadrature-phase-symbol correlator 37; the matched filter with the parallel architecture can then easily recover all $L=T_M(W+1)$ signals it is capable of receiving. As the input signals are offset in time due to differences in length of the propagation path, and since the in-phase-symbol correlator 35 and the quadrature-phase-symbol correlator 37 are linear devices, the outputs due to the signals' propagation through different channels are output by the in-phase-symbol correlator 35 and the quadrature-phase-symbol correlator 37 offset in time. Thus the reception and separation of the signals propagating through different channels does not require any additional circuits and the individual signals, which are now separate in time, can be easily individually manipulated and combined in optimum ways such that the matched filter receiver attains the performance of an L-diversity system.

A receiver capable of identifying, separating and combining large numbers (L) of signal replicas propagating through different channels is a time diversity receiver and is commonly called a RAKE receiver. The RAKE receiver structure can be implemented using the matched filter without the excessive complexity incurred by alternative system implementations. The in-phase-symbol correlator 35 and the quadrature-phase-symbol correlator 37 implementation at the heart of the diversity processing system has the advantage of lower implementation cost, lower physical volume, reduced power consumption, more rapid implementation, less complex control and better performance.

In contrast, the symbol correlator-based demodulator as described herein utilizes only one such set of circuits and, using information which is intrinsically generated, can then coherently demodulate any number of signal replicas that arrive via separate propagation paths. The mechanism by which this is accomplished is to employ one conventional phase tracking circuit, e.g., phase-locked loop (PLLs), Costas loop, or $n^{th}$ power loop, in order to establish a temporarily stable phase reference and to then extract the phase offset of each individual signal with respect to that phase reference. The incoming signal is first downconverted non-coherently to some frequency, including the 0 Hz frequency (DC). Then the in-phases and quadrature-phase channel outputs are read from the in-phase-symbol correlator 35 and the quadrature-phase-symbol correlator 37, respectively. The phase offset of the carrier signal is contained in the relative amplitudes of the in-phase and quadrature-phase outputs which are then used directly to demodulate the received data signal. Alternatively the phase estimate on the individual propagation paths can be improved by further correlating to demodulate the signal with performance equal to or better than that obtained using conventional coherent demodulators but without the added complexity introduced by conventional coherent demodulators. Therefore the symbol-correlator-based implementation has the advantage of much lower complexity, lower implementation cost, lower physical volume, reduced power consumption, more rapid implementation and better performance.

It will be apparent to those skilled in the art that various modifications can be made to the spread-spectrum-correlator apparatus of the instant invention without departing from the scope or spirit of the invention, and it is intended that the present invention cover modifications and variations of the spread-spectrum-correlator apparatus provided they come within the scope of the appended claims and their equivalents.

I claim:

1. A spread-spectrum-correlator apparatus, for use as part of a spread-spectrum receiver on a received-spread-spectrum signal having a plurality of packets, each of said plurality of packets generated from spread-spectrum processing a header-symbol-sequence signal with a header-chip-sequence signal and from spread-spectrum processing a data-symbol-sequence signal with a data-chip-sequence signal, with the header-chip-sequence signal being different from the data-chip-sequence signal, comprising:

a symbol-shift register, having a plurality of stages, for circulating a replica of the header-chip-sequence signal;

symbol-correlator means, coupled to the plurality of stages of said symbol-shift register and responsive to said symbol-shift register circulating the replica of the header-chip-sequence signal, for correlating, at an output of each stage of the symbol-shift register, a header-signal sample of the received-spread-spectrum signal, and for outputting, for each header-signal sample, corresponding to the plurality of stages of the symbol-shift register, a plurality of header-correlation signals, respectively, said symbol-correlator means, responsive to the plurality of header-correlation signals for detecting a despread-header-symbol signal, and responsive to a multiplicity of header-signal samples and to outputting the plurality of header-correlation signals for each of the header-signal samples, for detecting a plurality of despread-header-symbol signals as a despread-header-symbol-sequence signal;

a frame-shift register, having a plurality of stages, for circulating a replica of the header-symbol-sequence signal;

frame-correlator means, coupled to the plurality of stages of said frame-shift register, for correlating, at an output of each stage of the frame-shift register, a symbol-signal sample of the despread-header-symbol-sequence signal, and for outputting for each symbol-signal sample, corresponding to the plurality of stages of said frame-shift register, a plurality of frame-correlation signals, respectively, said frame-correlator means, responsive to a multiplicity of symbol-signal samples and to outputting the plurality of frame-correlation signals for each of the multiplicity of symbol-signal samples, for detecting a peak-header-correlation signal, and for generating a start-data signal in response to detecting the peak-header-correlation signal;

control means, coupled to said symbol-shift register, responsive to the start-data signal, for setting said symbol-shift register for circulating a replica of the data-chip-sequence signal; and said symbol-correlator means, responsive to said symbol-shift register circulating the replica of the data-chip-sequence signal, for correlating, at the output of each stage of said symbol-shift register, a data-signal sample of the received-spread-spectrum signal, and for outputting, for each data-signal sample, corresponding to the plurality of stages of said symbol-shift register, a plurality of data-correlation signals, respectively, said symbol-correlator means, responsive to the plurality of data-correlation signals, for detecting a despread-data-symbol signal, and responsive to a multiplicity of data-signal samples and to outputting the plurality of data-correlation signals for each of the data-signal samples, for detecting a plurality of despread-data-symbol signals as a despread-data-symbol-sequence signal.

2. The spread-spectrum-correlator apparatus as set forth in claim 1 with said symbol-correlator means including:

in-phase-symbol-correlator means, coupled to the plurality of stages of said symbol-shift register and responsive to said symbol-shift register circulating the replica of the header-chip-sequence signal, for correlating, at the output of each stage of the symbol-shift register, an in-phase component of the header-signal sample of the received-spread-spectrum signal, and for outputting, for each in-phase component of the header-signal sample, corresponding to the plurality of stages of said symbol-shift register, a plurality of in-phase header-correlation signals, respectively, said in-phase-symbol-correlator means, responsive to the plurality of in-phase header-correlation signals, for detecting an in-phase despread-header-symbol signal, and responsive to a multiplicity of in-phase components of the header-signal samples and to outputting the plurality of in-phase header-correlation signals for each of the in-phase components of the header-signal samples, for detecting a plurality of in-phase despread-header-symbol signals as an in-phase component of the despread-header-symbol-sequence signal; and quadrature-phase-symbol-correlator means, coupled to the plurality of stages of said symbol-shift register and responsive to said symbol-shift register circulating the replica of the header-chip-sequence signal, for correlating, at the output of each stage of the symbol-shift register, a quadrature-phase component of the header-signal sample of the received-spread-spectrum signal, and for outputting, for each quadrature-phase component of the header-signal sample, corresponding to the plurality of stages of said symbol-shift register, a plurality of quadrature-phase header-correlation signals, respectively, said quadrature-phase-symbol-correlator means, responsive to the plurality of quadrature-phase header-correlation signals for detecting a quadrature-phase despread-header-symbol signal, and responsive to a multiplicity of quadrature-phase components of the header-signal samples and to outputting the plurality of quadrature-phase header-correlation signals for each of the quadrature-phase components of the header-signal samples, for detecting a plurality of quadrature-phase despread-header-symbol signals as a quadrature-phase component of the despread-header-symbol-sequence signal.

3. The spread-spectrum-correlator apparatus as set forth in claim 1 or 2 with said frame-correlator means including:

in-phase-frame-correlator means coupled to the plurality of stages of said frame-shift register, for correlating, at the output of each stage of said frame-shift register, an in-phase component of the symbol-signal sample of the despread-header-symbol-sequence signal, and for outputting, for each in-phase component of each symbol-signal sample, corresponding to the plurality of stages of said frame-shift register, a plurality of in-phase frame-correlation signals, respectively, said in-phase-frame-correlator means, responsive to a multiplicity of in-phase components of the symbol-signal samples and to outputting the plurality of frame-correlation signals for each of the multiplicity of the in-phase components of the symbol-signal samples, for detecting an in-phase peak-header-correlation signal, and for generating an in-phase start-data signal in response to detecting the in-phase peak-header-correlation signal; and quadrature-phase-frame-correlator means coupled to the plurality of stages of said frame-shift register, for correlating, at the output of each stage of said frame-shift register, a quadrature-phase component of the symbol-signal sample of the despread-header-symbol-sequence signal, and for outputting, for each quadrature-phase component of each symbol-signal sample, corresponding to the plurality of stages of said frame-shift register, a plurality of quadrature-phase frame-correlation signals, respectively, said quadrature-phase-frame-correlator means, responsive to a multiplicity of quadrature-phase components of the symbol-signal samples and to outputting the plurality of quadrature-phase frame-correlation signals for each of the multiplicity of quadrature-phase components of the symbol-signal samples, for detecting the quadrature-phase peak-header-correlation signal, and for generating a quadrature-phase start-data signal in response detecting the quadrature-phase peak-header-correlation signal.

4. The spread-spectrum-correlator apparatus as set forth in claim 2, wherein:

said in-phase-symbol-correlator means, responsive to said symbol-shift register circulating the replica of the data-chip-sequence signal, for correlating, at the output of each stage of the symbol-shift register, an in-phase component of the data-signal sample of the received-spread-spectrum signal, and for outputting, for each in-phase component of the data-signal sample, corresponding to the plurality of stages of said symbol-shift register, a plurality of in-phase data-correlation signals, respectively, said in-phase-symbol-correlator means, responsive to the plurality of in-phase data-correlation signals, for detecting an in-phase despread-data-symbol signal, and responsive to a multiplicity of in-phase components of the data-signal samples and to outputting the plurality of in-phase data-correlation signals for each of the in-phase components of the data-signal samples, for detecting a plurality of in-phase despread-data-symbol signals as an in-phase component of the despread-data-symbol-sequence signal; and said quadrature-phase-symbol-correlator means, responsive to said symbol-shift register circulating the replica of the data-chip-sequence signal, for correlating, at the output of each stage of the symbol-shift register, a quadrature-phase component of the data-signal sample of the received-spread-spectrum signal, and for outputting, for each quadrature-phase component of the data-signal sample, corresponding to the plurality of stages of said symbol-shift register, a plurality of quadrature-phase data-correlation signals, respectively, said quadrature-phase-symbol-correlator means, responsive to the plurality of quadrature-phase data-correlation signals, for detecting a quadrature-phase despread-data-symbol signal, and responsive to a multiplicity of quadrature-phase components of the data-signal samples and to outputting the plurality of quadrature-phase data-correlation signals for each of the quadrature-phase components of the data-signal samples, for detecting a plurality of quadrature-phase despread-data-symbol signals as a quadrature-phase component of the despread-data-symbol-sequence signal.

5. The spread-spectrum-correlator apparatus as set forth in claim 4 further including demodulator means, coupled to said in-phase-symbol-correlator means and to said quadrature-phase-symbol-correlator means, for demodulating the in-phase component of the despread-data-symbol-sequence signal and the quadrature-phase component of the despread-data-symbol-sequence signal, as a received-data-symbol-sequence signal.

6. The spread-spectrum-correlator apparatus as set forth in claim 2 wherein:

said in-phase-symbol-correlator means includes an in-phase digital correlator; and said quadrature-phase-symbol-correlator means includes a quadrature-phase digital correlator.

7. The spread-spectrum-correlator apparatus as set forth in claim 3 wherein:

said in-phase-frame-correlator means includes an in-phase digital correlator; and said quadrature-phase-frame-correlator means includes a quadrature-phase digital correlator.

8. The spread-spectrum-correlator apparatus as set forth in claim 1, further including demodulator means, coupled to said symbol-correlator means, for demodulating the despread-data-symbol-sequence signal as a received data-symbol-sequence signal.

9. The spread-spectrum-correlator apparatus as set forth in claim 1 or 8 wherein:

said symbol-correlator means includes a digital correlator, coupled to the plurality of stages of said symbol-shift register, for correlating, at the output of each stage of the symbol-shift register, a header-signal sample of the received-spread-spectrum signal, and for outputting, for each header-signal sample, corresponding to the plurality of stages of the symbol-shift register, a plurality of header-correlation signals, respectively, said symbol-correlator means, responsive to the plurality of header-correlation signals, for detecting the despread-header-symbol signal, and responsive to a multiplicity of header-signal samples and to outputting the plurality of header-correlation signals for each of the header-signal samples, for detecting a plurality of despread-header-symbol signals as a despread-header-symbol-sequence signal; and said frame-correlator means includes a digital correlator, coupled to the plurality of stages of said frame-shift register, for correlating, at the output of each stage of the frame-shift register, a symbol-signal sample of the despread-header-symbol-sequence signal, and for outputting for each symbol-signal sample, corresponding to the plurality of stages of said frame-shift register, the plurality of frame-correlation signals, respectively, said frame-correlator means, responsive to the multiplicity of symbol-signal samples and to outputting the plurality of frame-correlation signals for each of the multiplicity of symbol-signal samples, for detecting the peak-header-correlation signal, and for generating the start-data signal in response to detecting the peak-header-correlation signal.

10. A method, using a symbol-shift register having a plurality of stages, a symbol correlator, a frame-shift-register having a plurality of stages, and a frame correlator, with a spread-spectrum receiver on a received-spread-spectrum signal, the received-spread-spectrum signal having a plurality of packets, with each packet generated from spread-spectrum processing a header-symbol-sequence signal with a header-chip-sequence signal and from spread-spectrum processing a data-symbol-sequence signal with a data-chip-sequence signal, with the header-chip-sequence signal being different from the data-chip-sequence signal, comprising the steps of:

circulating, in the symbol-shift register, a replica of the header-chip-sequence signal;

correlating, with the symbol correlator, at an output of each stage of the symbol-shift register, a header-signal sample of the received-spread-spectrum signal;

outputting, from the symbol correlator, for each header-signal sample, corresponding to the plurality of stages of the symbol-shift register, a plurality of header-correlation signals, respectively;

detecting, in response to the header-correlation signals, a despread-header-symbol signal;

detecting, in response to a multiplicity of header-signal samples and to outputting the plurality of header-correlation signals for each of the header-signal samples, a plurality of despread-header-symbol signals as a despread-header-symbol-sequence signal;

circulating, in the frame-shift register, a replica of the header-symbol-sequence signal;

correlating, with the frame correlator, at an output of each stage of the frame-shift register, a symbol-signal sample of the despread-header-symbol-sequence signal;

outputting, from the frame correlator, for each symbol-signal sample, corresponding to the plurality of stages of the frame-shift register, a plurality of frame-correlation signals, respectively;

detecting, in response to a multiplicity of symbol-signal samples and to outputting the plurality of frame-correlation signals for each of the multiplicity of symbol-signal samples, a peak-header-correlation signal;

generating, in response to detecting the peak-header-correlation signal, a start-data signal;

setting, in response to the start-data signal, said symbol-shift register for circulating a replica of the data-chip-sequence signal;

correlating, in response to said symbol-shift register circulating the replica of the data-chip-sequence signal, at the output of each stage of the symbol-shift register, a data-signal sample of the received-spread-spectrum signal;

outputting, for each data-signal sample, corresponding to the plurality of stages of said symbol-shift register, a plurality of data-correlation signals, respectively;

detecting, in response to the plurality of data-correlation signals, a despread-data-symbol signal; and detecting, in response to a multiplicity of data-signal samples and to outputting the plurality of data-correlation signals for each of the data-signal samples, a plurality of despread-data-symbol signals as a despread-data-symbol-sequence signal.

11. The method as set forth in claim 10, further including the steps of:

correlating, in response to said symbol-shift register circulating the replica of the header-chip-sequence signal, at the output of each stage of the symbol-shift register, an in-phase component of the header-signal sample of the received-spread-spectrum signal;

outputting, for each in-phase component of the header-signal sample, corresponding to the plurality of stages of said symbol-shift register, a plurality of in-phase header-correlation signals, respectively;

detecting, in response to a multiplicity of in-phase components of the header-signal samples and to outputting the plurality of in-phase header-correlation signals for each of the in-phase components of the header-signal samples, an in-phase component of the despread-header-symbol-sequence signal;

correlating, in response to said symbol-shift register circulating the replica of the header-chip-sequence signal, at the output of each stage of the symbol-shift register, a quadrature-phase component of the header-signal sample of the received-spread-spectrum signal;

outputting, for each quadrature-phase component of the header-signal sample, corresponding to the plurality of stages of said symbol-shift register, a plurality of quadrature-phase header-correlation signals, respectively; and detecting, in response to a multiplicity of quadrature-phase components of the header-signal samples and to outputting the plurality of quadrature-phase header-signal-correlation signals for each of the quadrature-phase components of the header-signal samples, a quadrature-phase component of the despread-header-symbol-sequence signal.

12. The method as set forth in claim 11, further including the steps of:

generating an in-phase start-data signal in response to the in-phase component of the despread-header-symbol-sequence signal matching an in-phase-frame-impulse response; and generating a quadrature-phase start-data signal in response to the quadrature-phase component of the despread-header-symbol-sequence signal matching a quadrature-phase-frame-impulse response.

13. The method as set forth in claim 11 further including the step of demodulating the in-phase component of the despread-header-symbol-sequence signal and the quadrature-phase component of the despread-header-symbol-sequence signal, as a received-header-symbol-sequence signal.

14. The method as set forth in claim 10, further including the step of demodulating the despread-data-symbol-sequence signal as a received data-symbol-sequence signal.

15. The method as set forth in claim 10, further including the steps of:

correlating, in response to said symbol-shift register circulating the replica of the data-chip-sequence signal, at the output of each stage of the symbol-shift register, an in-phase component of the data-signal sample of the received-spread-spectrum signal;

outputting, for each in-phase component of the data-signal sample, corresponding to the plurality of stages of said symbol-shift register, a plurality of in-phase data-correlation signals, respectively;

detecting, in response to a multiplicity of in-phase components of the data-signal samples and to outputting the plurality of in-phase data-correlation signals for each of the in-phase components of the data-signal samples, an in-phase component of the despread-data-symbol-sequence signal;

correlating, in response to said symbol-shift register circulating a replica of the data-chip-sequence signal, at the output of each stage of the symbol-shift register, a quadrature-phase component of the data-signal sample of the received-spread-spectrum signal;

outputting, for each quadrature-phase component of the data-signal sample, corresponding to the plurality of stages of said symbol-shift register, a plurality of quadrature-phase data-correlation signals, respectively; and detecting, in response to a multiplicity of quadrature-phase components of the data-signal samples and to outputting the plurality of quadrature-phase data-signal-correlation signals for each of the quadrature-phase components of the data-signal samples, a quadrature-phase component of the despread-data-symbol-sequence signal.

16. The method as set forth in claim 15 further including the step of demodulating the in-phase component of the despread-data-symbol-sequence signal and the quadrature-phase component of the despread-data-symbol-sequence signal, as a received-data-symbol-sequence signal.

17. A spread-spectrum-correlator apparatus, for use with a spread-spectrum receiver on a received-spread-spectrum signal having a plurality of packets, with each packet generated from spread-spectrum processing a header-symbol-sequence signal with a chip-sequence signal and from spread-spectrum processing a data-symbol-sequence signal with the chip-sequence signal, with the header-chip-sequence signal being different from the data-chip-sequence signal, comprising:

a symbol-shift register, having a plurality of stages, for circulating a replica of the header-chip-sequence signal;

a symbol correlator, coupled to the plurality of stages of said symbol-shift register, for correlating, at an output of each stage of the symbol-shift register, a header-signal sample of the received-spread-spectrum signal, and for outputting, for each header-signal sample, corresponding to the plurality of stages of the symbol-shift register, a plurality of header-correlation signals, respectively, said symbol correlator, responsive to the plurality of header-correlation signals, for detecting a despread-header-symbol signal, and responsive to a multiplicity of header-signal samples and to outputting the plurality of header-correlation signals for each of the header-signal samples, for detecting a plurality of despread-header-symbol signals as a despread-header-symbol-sequence signal;

a frame correlator, having a frame-impulse response matched to the header-symbol-sequence signal, for filtering the despread-header-symbol-sequence signal and for generating a peak-header-correlation signal in response to the despread-header-symbol-sequence signal matching the frame-impulse response;

a control processor, coupled to said symbol-shift register, responsive to a start-data signal, for setting said symbol-shift register for circulating a replica of the data-chip-sequence signal;

said symbol correlator, responsive to said symbol-shift register circulating the replica of the data-chip-sequence signal, for correlating, at the output of each stage of said symbol-shift register, a data-signal sample of the received-spread-spectrum signal, and for outputting, for each data-signal sample, corresponding to the plurality of stages of symbol-shift register, a plurality of data-correlation signals, respectively; and said symbol correlator, responsive to the plurality of data-correlation signals, for detecting a despread-data-symbol signal, and responsive to a multiplicity of data-signal samples and to outputting the plurality of data-correlation signals for each of the data-signal samples, for detecting a plurality of despread-data-symbol signals as a despread-data-symbol-sequence signal.

18. The spread-spectrum matched-filter apparatus as set forth in claim 17, further comprising:

a frame-shift register, having a plurality of stages, for circulating a replica of the header-symbol-sequence signal; and said frame correlator, coupled to the plurality of stages of said frame-shift register, for correlating at an output of each stage of the frame-shift register, a symbol-signal sample of the despread-header-symbol signal, and for outputting for each symbol-signal sample, corresponding to the plurality of stages of said frame-shift register, a plurality of frame-correlation signals, respectively, said frame correlator, responsive to a multiplicity of symbol-signal samples and to outputting a plurality of frame-correlation signals for each of the multiplicity of symbol-signal samples, for detecting the peak-header-correlation signal, and for generating the start-data signal in response to detecting the peak-header-correlation signal.

19. The spread-spectrum-correlator apparatus as set forth in claim 17 with said symbol correlator including:

an in-phase-symbol correlator, coupled to the plurality of stages of said symbol-shift register and responsive to said symbol-shift register circulating the replica of the header-chip-sequence signal, for correlating, at the output of each stage of the symbol-shift register, an in-phase component of the header-signal sample of the received-spread-spectrum signal, and for outputting, for each in-phase component of the header-signal sample, corresponding to the plurality of stages of the symbol-shift register, a plurality of in-phase header-correlation signals, respectively, said in-phase-symbol correlator, responsive to the plurality of in-phase header-correlation signals, for detecting the in-phase despread-header-symbol signal, and responsive to a multiplicity of in-phase components of the header-signal samples and to outputting the plurality of in-phase header-correlation signals for each of the in-phase components of the header-signal samples, for detecting a plurality of in-phase despread-header-symbol signals as an in-phase component of the despread-header-symbol-sequence signal; and a quadrature-phase-symbol correlator, coupled to the plurality of stages of said symbol-shift register and responsive to said symbol-shift register circulating the replica of the header-chip-sequence signal, for correlating, at the output of each stage of the symbol-shift register, a quadrature-phase component of the header-signal sample of the received-spread-spectrum signal, and for outputting, for each quadrature-phase component of the header-signal sample, corresponding to the plurality of stages of said symbol-shift register, a plurality of quadrature-phase header-correlation signals, respectively, said quadrature-phase-symbol correlator, responsive to the plurality of quadrature-phase header-correlation signals, for detecting the quadrature-phase despread-header-symbol signal, and responsive to a multiplicity of quadrature-phase components of the header-signal samples and to outputting the plurality of quadrature-phase header-correlation signals for each of the quadrature-phase components of the header-signal samples, for detecting a plurality of quadrature-phase despread-header-symbol signals as a quadrature-phase component of the despread-header-symbol-sequence signal.

20. The spread-spectrum-correlator apparatus as set forth in claim 19 with said frame correlator including:

an in-phase-frame correlator, having an in-phase impulse response matched to an in-phase component of the header-symbol-sequence signal, for generating an in-phase-data-start signal in response to the in-phase component of the despread-header-symbol sequence signal matching the in-phase impulse response; and a quadrature-phase-frame correlator, having a quadrature-phase impulse response matched to a quadrature-phase component of the header-symbol-sequence signal, for generating a quadrature-phase-data-start signal in response to the quadrature-phase component of the despread-header-symbol sequence signal matching the quadrature-phase impulse response.

21. The spread-spectrum-correlator apparatus as set forth in claim 20 further including a demodulator, coupled to said in-phase-symbol correlator and to said quadrature-phase-symbol correlator, for demodulating the in-phase component of the despread-header-symbol-sequence signal and the quadrature-phase component of the despread-header-symbol-sequence signal as a received-header-symbol-sequence signal.

22. The spread-spectrum-correlator apparatus as set forth in claim 17, further including a demodulator, coupled to said symbol correlator, for demodulating the despread-data-symbol-sequence signal as a received data-symbol-sequence signal.

23. The spread-spectrum-correlator apparatus as set forth in claim 19 wherein:

said in-phase-symbol correlator, coupled to the plurality of stages of said symbol-shift register and responsive to said symbol-shift register circulating the replica of the data-chip-sequence signal, for correlating, at the output of each stage of the symbol-shift register, an in-phase component of the data-signal sample of the received-spread-spectrum signal, and for outputting, for each in-phase component of the data-signal sample, corresponding to the plurality of stages of the symbol-shift register, a plurality of in-phase data-correlation signals, respectively, said in-phase-symbol correlator, responsive to the plurality of in-phase data-correlation signals, for detecting the in-phase despread-data-symbol signal, and responsive to a multiplicity of in-phase components of the data-signal samples and to outputting the plurality of in-phase data-correlation signals for each of the in-phase components of the data-signal samples, for detecting a plurality of in-phase despread-data-symbol signals as an in-phase component of the despread-data-symbol-sequence signal; and said quadrature-phase-symbol correlator, coupled to the plurality of stages of said symbol-shift register and responsive to said symbol-shift register circulating the replica of the data-chip-sequence signal, for correlating, at the output of each stage of the symbol-shift register, a quadrature-phase component of the data-signal sample of the received-spread-spectrum signal, and for outputting, for each quadrature-phase component of the data-signal sample, corresponding to the plurality of stages of said symbol-shift register, a plurality of quadrature-phase data-correlation signals, respectively, said quadrature-phase-symbol correlator, responsive to the plurality of quadrature-phase data-correlation signals, for detecting the quadrature-phase despread-data-symbol signal, and responsive to a multiplicity of quadrature-phase components of the data-signal samples and to outputting the plurality of quadrature-phase data-correlation signals for each of the quadrature-phase components of the data-signal samples, for detecting a plurality of quadrature-phase despread-data-symbol signals as a quadrature-phase component of the despread-data-symbol-sequence signal.

24. The spread-spectrum-correlator apparatus as set forth in claim 23 further including a demodulator, coupled to said in-phase-symbol correlator and to said quadrature-phase-symbol correlator, for demodulating the in-phase component of the despread-data-symbol-sequence signal and the quadrature-phase component of the despread-data-symbol-sequence signal as a received-data-symbol-sequence signal.

* * * * *